No. 659,316. Patented Oct. 9, 1900.
E. PEACH.
FRUIT COOKER.
(Application filed June 11, 1900.)
(No Model.)

Witnesses.
F. L. Ourand.

Inventor:
Emma Peach.
By Lewis Bagger & Co.
Attorneys.

THE NORRIS PETERS CO., PHOTO-LITHO., WASHINGTON, D. C.

UNITED STATES PATENT OFFICE.

EMMA PEACH, OF WATERVILLE, MINNESOTA.

FRUIT-COOKER.

SPECIFICATION forming part of Letters Patent No. 659,316, dated October 9, 1900.

Application filed June 11, 1900. Serial No. 19,868. (No model.)

*To all whom it may concern:*

Be it known that I, EMMA PEACH, a citizen of the United States, residing at Waterville, in the county of Le Sueur and State of Minnesota, have invented new and useful Improvements in Fruit-Cookers, of which the following is a specification.

My invention relates to fruit-cookers; and one object of the same is to provide a device for this purpose which will permit sealed cans or jars of raw fruit to be placed in a steamer in such position that the steam will cook the fruit within the cans or jars without contact with the boiling water of the said cans or jars and will also permit the cans or jars to be removed simultaneously in order that all the fruit may be uniformly cooked.

Another object is to provide a device of this character which will be simple in construction and reliable in use.

I attain these objects by means of the construction shown in the accompanying drawings, which form a part of this specification, and in which—

Figure 1:
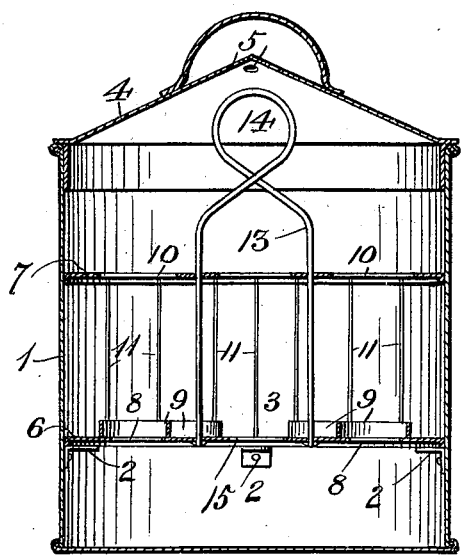
Figure 4:
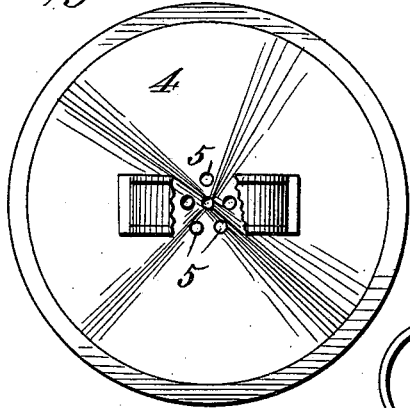
Figure 3:
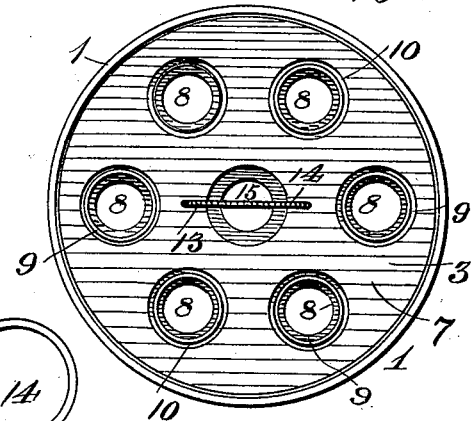
Figure 2:
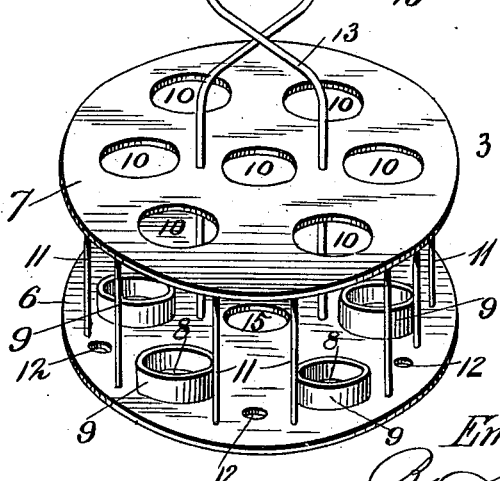

Figure 1 is a vertical section through a fruit-cooker made in accordance with my invention. Fig. 2 is a perspective view of the fruit-tray. Fig. 3 is a view looking into the steamer. Fig. 4 is a view of the top of the cover, the handle thereof being broken away to show the perforations in the said top.

Like numerals designate like parts wherever they occur in the different views of the drawings.

In the said drawings the numeral 1 designates a steamer, which consists of a closed vessel having brackets 2 secured at different points within the same to serve as a support for a fruit-tray 3. This steamer may be used separately for any other purpose than cooking fruit, if desired. The cover 4 of this steamer is provided with a number of perforations 5 in the top thereof to permit the steam to escape. The fruit-tray 3 consists of two disks 6 7, the lower disk 6 having any suitable number of perforations 8 of a size sufficiently small to permit a fruit can or jar to rest thereon without passing through. Flanges 9 are secured to the disk and surround the perforations at such a distance therefrom as to permit the can or jar to rest over the perforation and to be held in an upright position by the flanges. The upper disk 7 is also provided with a number of perforations 10 of a size to permit the cans to pass therethrough and to hold said cans or jars in position. The disks 6 and 7 are held the required distance apart by upright wires or supports 11, secured to both disks. A number of small perforations 12 are formed in the lower disk to permit the steam to rise and surround the jars or cans, and a handle 13, secured at its lower ends to the bottom disk, extends up through the upper disk and is formed into a loop 14, which serves as a handhold in removing the tray from the steamer. A central perforation 15 is also formed in the lower disk 6 to permit steam to rise and surround the cans or jars.

The operation of my device is as follows: Raw fruit is placed in jars or cans and said jars or cans are sealed and placed within the perforations in the fruit-tray and rest upon the lower disk thereof. Water is now placed in the steamer, the water-level being below the brackets 2 in order that the water therein will not come in contact with the cans or jars. The tray is now placed within the steamer with the cans or jars therein, and the cover is placed thereon. As the steam rises from the water it surrounds the jars or cans and thoroughly cooks the fruit therein, the surplus steam escaping through the perforations in the cover. When the fruit has been thoroughly cooked, the cover is removed and the tray is lifted from the steamer by the handle 13 and the jars or cans removed therefrom and replaced with jars or cans for cooking. The operation may thus be made continuous.

It will be obvious from the foregoing that my device is simple in operation, efficient in use, will not permit the cans or jars to come in contact with the water, but will thoroughly steam and cook the fruit in the sealed cans or jars and permit them to be removed simultaneously. The tray may be provided with any suitable number of perforations for the cans or jars.

Having thus fully described my invention, what I claim is—

A fruit-cooker comprising an outer receptacle or steamer having brackets therein to support a fruit-jar tray and provided with a perforated cover, a fruit-jar tray designed to be inserted in said steamer and comprising an upper and lower disk, the lower disk having a series of perforations therein of a size smaller than the cans or jars to be used, and annular rings surrounding said perforations to support said jars or cans, a number of perforations in said disk to permit the passage of steam therethrough, wire supports attached to said disks for holding them apart, the upper disk having a number of perforations registering with those in the lower disk, and a wire handle attached to the lower disk and extending upward through the upper disk and formed into a handhold, substantially as described.

In testimony whereof I have hereunto set my hand in presence of the subscribing witnesses.

EMMA PEACH.

Witnesses:
N. M. STIREM,
Mrs. A. W. PREBLE,
P. J. KINNIER.